March 17, 1970            A. M. ELSON            3,500,867
REINFORCED FLEXIBLE HOSE
Filed Jan. 23, 1967
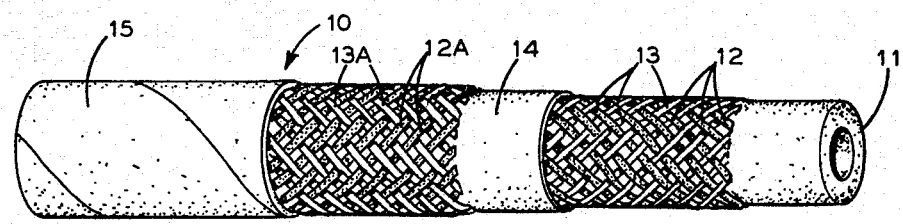
INVENTOR.
Arthur M. Elson
BY
ATTORNEY 3,500,867
REINFORCED FLEXIBLE HOSE
Arthur M. Elson, Hamilton Township, N.J., assignor to Acme-Hamilton Manufacturing Corporation, Trenton, N.J.
Filed Jan. 23, 1967, Ser. No. 610,876
Int. Cl. F16l 11/08
U.S. Cl. 138—125                             5 Claims

ABSTRACT OF THE DISCLOSURE

A flexible hose for use under high pressures; the hose being reinforced with glass fiber yarns arranged in non-contacting relation to each other within the hose carcass.

BACKGROUND OF THE INVENTION

Hose subject to high pressures are conventionally reinforced with spiral metal wire or braided metal wire. Such hose are quite heavy and have very limited flexibility which restricts the use thereof, particularly when high flexure of the hose is desirable.

While attempts have been made to replace the wire or braid reinforcement with non-metallic reinforcing elements; it has been found that the substitute reinforcing materials have either reduced bursting strength or have a rather limited useful life due to rapid deterioration of the reinforcing elements under conditions of use.

SUMMARY OF THE INVENTION

The instant invention essentially comprises the disposition of glass fiber yarns in the carcass of a hose so that the yarns are in non-contacting relation to each other. The yarns have a spiral lay and occur in two layers slightly spaced apart, the lays of the layers being of opposite hand so as to balance the reinforcing effects of the layers when the hose is subjected to high pressure conditions of use.

BRIEF DESCRIPTION OF THE DRAWING

The single figure is a perspective view showing the reinforced hose embodying the invention.

DESCRIPTION OF THE PREFERRED EMBODIMENT

As shown in the drawing, 10 designates a flexible reinforced hose embodying the invention. The same comprises an inner carcass portion 11 of elastomeric material such as natural or synthetic rubber. The synthetic rubber may be chloroprene, butadiene-styrene copolymer, butadiene-acrylonitrile copolymer, isobutylene-isoprene copolymer, or the like. The rubber may be selected in terms of the materials being transported by the hose and the properties of such materials including corrosion, temperature and the like.

The carcass portion 11 is formed by extruding the selected elastomeric material in seamless, tubular form, or may be formed by other procedures known in the art. Reinforcing is then applied over the exterior surface of carcass portion 11 in the form of glass fiber yarns generally indicated at 12.

Such glass fiber yarns are of the multifilament, untwisted type and are of a selected denier, as for example a 750 denier yarn. The filaments of the yarn are held together by a lightly applied rubber binder, in a manner known in the art. The denier of the glass fiber yarns may be varied in accordance with the I.D. of the hose 10. Thus, the yarn denier may range from about 750 up to about 10,000 for hose having an I.D. ranging from ¼" to 4".

Conveniently, the reinforcing yarns 12 are applied to inner carcass portion 11 by a braiding operation. Thus, the yarns 12 are disposed on carriers of a conventional braiding machine, not shown, together with locating yarns 13 of rayon or the like, which cross yarns 12 in the braiding operation and effectively space yarns 12 from each other, so that there is no contact between adjacent yarns 12 in the spiral lay of said yarns about inner carcass portion 11. The spacing between adjacent yarns 12 may range from about 0.030" to about 0.125".

A thin layer of elastomeric material 14 is then applied over the braided yarns 12, 13; layer 14 having a thickness of the order of from about 0.010" to about 0.032" and preferably about 0.025". The material of layer 14 is similar to that of inner carcass portion 11.

A second set of reinforcing glass fiber yarns 12A are then braided over layer 14, together with locating yarns 13A of rayon or the like, as previously described; except that the lay of yarns 12A is of opposite hand to that of yarns 12. Thus, yarns 12, 12A have a very slight separation from each other by way of the intervening layer 14. However, it has been found that yarns 12, 12A coact as a balanced reinforcing unit for the carcass of hose 10.

In accordance with the size of the hose 10 and the working pressures to which the hose may be subject; additional sets of yarns 12, 12A with an intervening elastomeric layer 14 may be applied over the first set of yarns 12, 12A with a thin separating layer of elastomeric material between the successive sets of yarns 12, 12A; by braiding as described above.

An outer carcass portion 15 of elastomeric material similar to that of carcass portions 11, 14; is applied over the braided yarns 12A, 13A, in spiral tape form, by extrusion, or the like. The resultant assembly is subjected to vulcanization in a conventional manner, thus integrating the carcass portions 11, 14 and 15 with the reinforcing yarns 12, 12A interposed and embedded therein.

It will be apparent that the individual yarns 12, 12A are retained in separated, non-contacting relation, at all times. Such yarn separation has been found to be particularly effective when hose 10 is under high pressure and the resistance to bursting is very high despite such yarn separation. It is understood that the rayon yarns 13, 13A serve only to locate the glass fiber yarns 12, 12A in their spaced relation, and have little or no reinforcing properties. Other non-metallic yarns such as cotton or the like, may be used in lieu of rayon for yarns 13, 13A.

While the yarns 12, 12A are conveniently introduced into the hose carcass by braiding operations, it is understood that said yarns may be applied to the carcass portions 11, 14 by other known procedures, as by spiralling the same in place, and the like.

The hose of the instant invention is highly flexible while still retaining its high bursting strength. Thus, a 1' length of 1" hose held horizontally and at one end thereof, will show at the free end thereof an angular deflection of about 30°. A similar length of 1" hose having a conventional braided metal wire reinforcement, held horizontally and at one end thereof, will show no angular deflection at the free end thereof.

Despite adverse conditions of use, as under high bursting pressures and abuse, the reinforcing yarns 12, 12a have been found to be effective to prevent blowouts and deformation of the hose. Further, the reinforcing yarns 12, 12a show no deterioration, thus extending the useful life of hose 10.

The hose of the instant invention can have carcass wall portions of reduced thickness as compared to that of metal wire reinforced hose thereby achieving a weight reduction of up to 50% for a given load factor. The hose being altogether non-metallic, is particularly effective in environments including high tension electrical lines and electrical equipment generally. Also, there are no corrosion effects when the hose is used in a moist atmosphere, such as in steam hose service; in contrast to corrosion encountered with conventional metal wire reinforced hose.

As various changes might be made in the herein disclosed embodiment of the invention without departing from the spirit thereof, it is understood that all matter herein shown or described shall be deemed illustrative and not by way of limitation.

What is claimed is:

1. A flexible hose resistant to high bursting pressures comprising a carcass of elastomeric material having inner and outer carcass portions, means for reinforcing said carcass embedded between said inner and outer carcass portions, said reinforcing means comprising first and second sets of untwisted multifilament glass fiber yarns, said sets of yarns being in concentric, radially spaced relation to each other, the adjacent yarns in each set of yarns being in laterally spaced relation to each other throughout the length thereof, and an intermediate carcass portion separating said sets of yarns, the yarns in each set of yarns extending spirally within the carcass, the yarns of one set of yarns having a lay opposite to the lay of the yarns in the other set of yarns.

2. A hose as in claim 1 wherein said intermediate carcass portion has a thickness of from about 0.010" to about 0.032".

3. A hose as in claim 1 wherein each set of yarns includes a plurality of locating yarns in crossing, braided relation to the glass fiber yarns, said locating yarns being operative to retain the adjacent glass fiber yarns in each set of yarns, in spaced relation to each other.

4. A hose as in claim 1 wherein said glass fiber yarns have a denier of from about 750 to about 10,000.

5. A hose as in claim 4 wherein the adjacent glass fiber yarns in each set of yarns have a spacing of from about 0.030" to about 0.125".

References Cited

UNITED STATES PATENTS

| | | | |
|---|---|---|---|
| 1,284,956 | 11/1918 | Emrick | 138—124 |
| 1,914,455 | 6/1933 | Pahl | 138—132 XR |
| 2,383,733 | 8/1945 | Parker | 138—126 |
| 2,690,769 | 10/1954 | Brown | 138—125 |
| 2,752,952 | 7/1956 | Dauphinais | 138—125 |
| 2,788,804 | 4/1957 | Larkin | 138—125 |
| 2,906,638 | 9/1959 | Herman | 138—126 XR |
| 3,117,597 | 1/1964 | Fritz et al. | 138—125 |
| 3,334,663 | 8/1967 | Peterson | 138—132 |

H. HAMPTON HUNTER, Primary Examiner

U.S. Cl. X.R.

138—132